No. 784,582. PATENTED MAR. 14, 1905.
O. E. MOATS.
ELEVATING GRADER.
APPLICATION FILED DEC. 17, 1904.
2 SHEETS—SHEET 2.
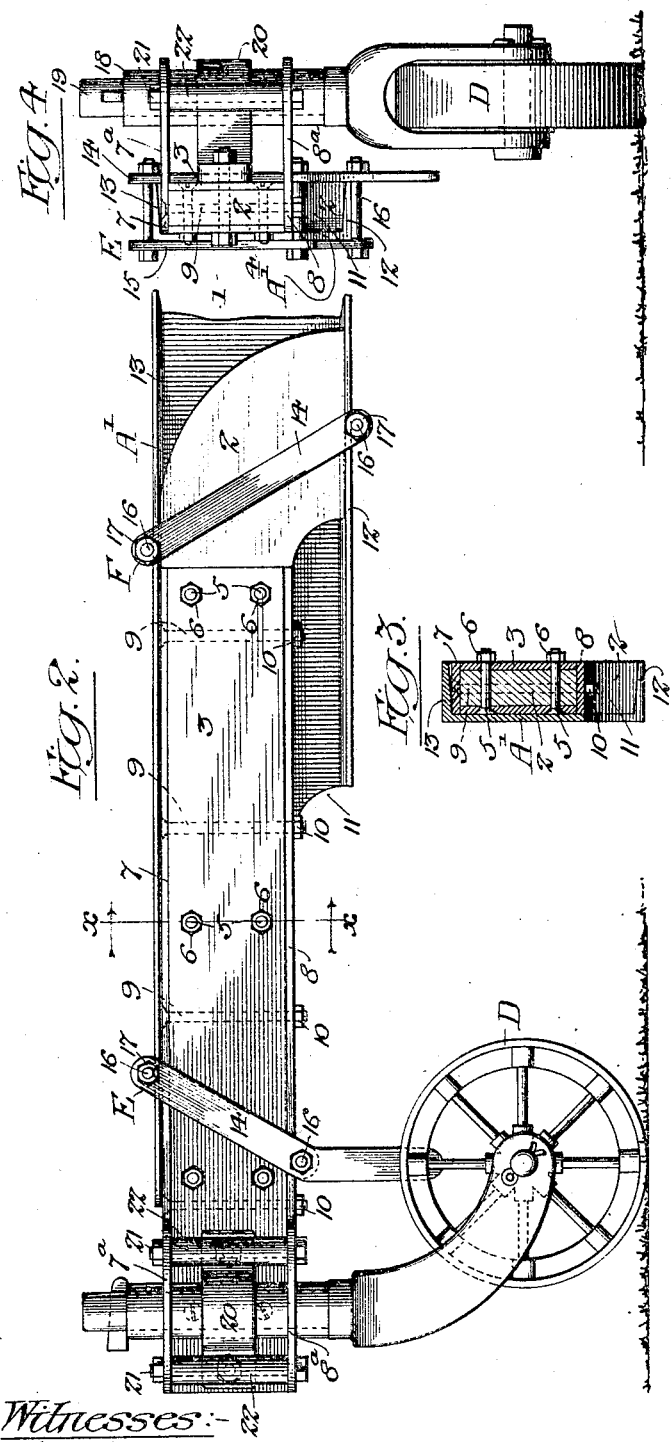
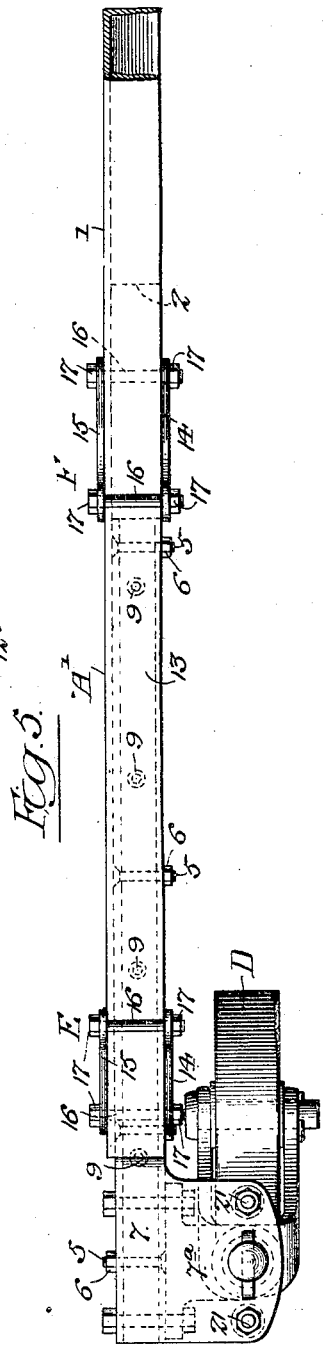

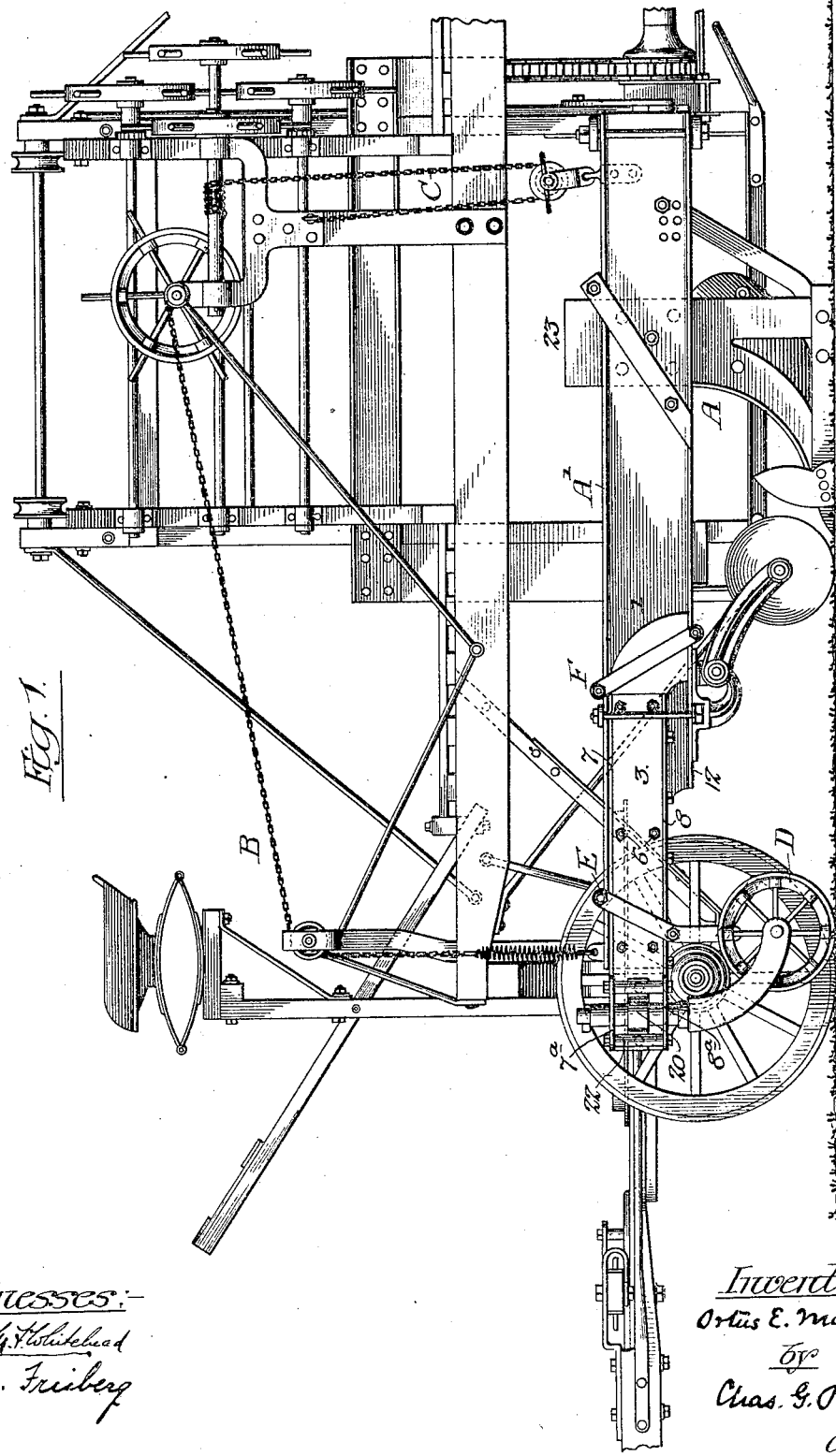

No. 784,582. Patented March 14, 1905.

UNITED STATES PATENT OFFICE.

ORTUS E. MOATS, OF HARVEY, ILLINOIS, ASSIGNOR TO NATIONAL DRILL & MANUFACTURING COMPANY, OF CHICAGO, ILLINOIS, A CORPORATION OF WEST VIRGINIA.

ELEVATING-GRADER.

SPECIFICATION forming part of Letters Patent No. 784,582, dated March 14, 1905.

Application filed December 17, 1904. Serial No. 237,331.

*To all whom it may concern:*

Be it known that I, ORTUS E. MOATS, a citizen of the United States, residing at Harvey, in the county of Cook and State of Illinois, have invented certain new and useful Improvements in Elevating-Graders, of which the following is a specification.

My invention relates to elevating-graders of the class in which the plow is suspended by cables at one side of a wheeled carriage, the latter being provided with an elevating-conveyer for taking loosened soil from the plow.

Objects of my invention are to keep the caster-wheel of the plow-beam out of the furrow and to provide a strong, compact, and durable construction of longitudinally-adjustable plow-beam.

In the accompanying drawings, Figure 1 represents in side elevation the major portion of an elevating-grader or grading and ditching machine embodying my improvements, the rear portion of said machine being broken away and the elevating-conveyer being omitted for convenience of illustration. Fig. 2 shows the forward portion of the plow-beam in side elevation on a larger scale. Fig. 3 is a section on line x x in Fig. 2. Fig. 4 is a front end elevation of Fig. 2. Fig. 5 is a top plan view of Fig. 2.

The carriage or wheeled body-frame illustrated in Fig. 1 generally corresponds with the wheeled body-frame illustrated in Letters Patent of the United States numbered 743,487 and dated November 10, 1903. The plow A is arranged at one side of the wheeled body-frame and suspended by cables B and C, which are connected with winding devices, whereby the plow can be raised and lowered, as in said patent.

The plow-beam A' is provided at its forward end with a caster-wheel D, which runs upon the ground when the plow is in use. During operation it is desirable to keep the caster-wheel on the land side of a previously-cut furrow, and prior to my invention considerable difficulty has been experienced in so doing, it being frequently necessary to place the plow-beam oblique to the line of progression, so as to deflect the forward end of the plow-beam laterally from the carriage. In order to overcome the objectionable feature of thus holding the plow-beam oblique to the line of progression, I arrange the caster-wheel in a vertical plane at one side of a vertical plane coincident with the length of the plow-beam, whereby the caster-wheel is set out from the plow-beam, as best shown in Figs. 4 and 5, and its travel upon the ground at the land side of a furrow insured.

With reference to details of construction shown the plow-beam comprises a couple of members or sections. One of these sections consists of a metal channel-bar 1, and the other consists of a wooden bar 2, combined with oblong metal side plates 3 and 4, which are respectively clamped against opposite sides of the wooden bar by horizontal bolts 5 and nuts 6 on threaded ends of such bolts, and oblong upper and lower metal plates 7 and 8, respectively, clamped against the upper and lower sides of the wooden bar by vertical bolts 9, (shown in dotted lines,) extending through said plates 7 and 8 and wooden bar 2 and having threaded ends provided with nuts 10. This arrangement forms as a whole a composite bar-section which is attached to the channel-bar 1, so as to complete the plow-beam.

The forward end portion of the channel-bar 1 is reduced in width by cutting away a portion of its width, as at 11, along the lower portion of the bar, thereby terminating the lower flange 12 of bar 1 at a point short of the forward end of such bar. The composite bar-section composed of the wooden portion 2 clamped between the four metal plates 3, 4, 7, and 8 is of less width than the greatest width of the channel-bar 1 and is fitted up against the under side of flange 13 of such channel-bar, and with this arrangement the rear end portion of the wooden bar 2 extends downwardly so as to bear upon the upper side of the lower flange 12 of the channel-bar 1, as in Figs. 1 and 2.

The two bar-sections—namely, the channel-bar 1 and the composite wood and metal bar-section—are held together to form the complete length of plow-beam by clamps E and F, each comprising a pair of straps or plates 14 15, embodying the bar-sections and tied together by bolts 16, having tightening-nuts 17. The straps 15 15 are inclined, and while their upper tie-bolts 16 cross and bear upon upper flange 13 of the channel-bar 1 the lower tie-bolt of the forward pair of straps 14 15 bears against the lower plate 8, and the tie-bolt 16 for the rear pair of straps 14 15 bears against the lower flange 12 of the channel-bar 1. The composite bar-section thus composed of wood and metal can be adjusted relatively to channel-bar 1 after first loosening the nuts 17 on the strap-bolts 16, whereby the plow-beam can be extended or contracted in length, it being seen that as arranged this composite bar-section forms a forward extension of the channel-bar 1 and that the caster-wheel is attached to such extension.

The portion of the adjustable bar extension which projects forwardly from the forward end of the channel-bar 1 has its upper metal plate 7 formed with a lateral extension 7$^a$ and its lower metal plate 8 formed with a corresponding lateral extension 8$^a$. These two lateral extensions 7$^a$ and 8$^a$ form bearing portions on the land side of the plow-beam and projecting laterally from the plow-beam to an extent to receive a socket 18 for the caster-wheel stem and permit the caster-wheel to set out from the plow-beam.

The socket 18 is fitted in suitable openings in the plate portions 7$^a$ and 8$^a$ and is further held in rigid connection with the forward extension of the plow-beam by a strap or bearing 20, bolted to such extension. The stem 19 turns in the socket 18 and has at its lower end an ordinary yoke for the caster-wheel spindle.

The plate portions 7$^a$ and 8$^a$ are also further braced by bolts 21, extending through such plate portions and through sleeves 22, arranged between these plate portions, thereby providing a strong and rigid structure.

The plow-standard 23 is secured to the channel-bar section 1 at a point back of the composite bar or section which carries the caster-wheel.

I do not confine myself to the construction of body-frame shown in said patent and herein illustrated, it being understood that I have selected such body-frame as illustrating one of a class of elevating-graders or grading and ditching machines to which my invention is applicable.

What I claim as my invention is—

1. In an elevating-grader of the class described, the plow arranged at one side of a wheeled body-frame and having its beam provided at its forward end with a caster-wheel arranged at one side of such plow-beam.

2. In an elevating-grader of the class described, the plow having its beam provided with a lateral extension at the forward end thereof, and a caster-wheel having its spindle connected with such lateral extension.

3. In an elevating-grader of the class described, the plow having its beam constructed with a forward longitudinally-adjustable section carrying a caster-wheel arranged in a plane at one side of the main length of the plow-beam.

4. In an elevating-grader of the class described, the plow having its beam constructed with one section consisting of a metal channel-bar, and another section comprising a wooden bar clamped between metal plates and provided with a caster-wheel.

5. In an elevating-grader of the class described, the plow having its beam constructed with one section consisting of a flanged metal bar, and another section comprising a wooden bar clamped between upper and lower metal plates, said plates being provided with lateral extensions to which a caster-wheel is attached.

6. In an elevating-grader of the class described, the plow having its beam constructed with a channel-bar having its forward end portion cut away in width thereby terminating the lower flange of such bar short of its forward end, and a composite bar or section adjustably secured to the channel-bar and constructed with a wooden bar clamped between metal plates; clamp-straps by which the channel-bar and said composite bar are held together; and a caster-wheel on the forward end portion of the said composite bar or section.

7. In an elevating-grader of the class described, the plow having its beam constructed with a channel-bar, and a composite bar or section composed of wood and metal; means for clamping such bars together; and a caster-wheel on the composite bar; the said composite bar being arranged against the upper flange of the channel-bar and the lower flange of the latter being terminated short of its forward end.

8. In an elevating-grader of the class described, the plow having its beam constructed with a channel-bar 1, and a composite bar constructed with a wooden bar portion 2 clamped between upper and lower metal plates, the rear end of the wooden bar portion being formed and arranged to bear on the lower flange of the channel-bar, and the upper metal plate being held against the upper flange of the channel-bar; and means for holding said bars together.

ORTUS E. MOATS.

Witnesses:
ALLEN R. COSGROVE,
F. A. FRENCH.